Oct. 11, 1966  F. H. SMITH  3,277,782
ILLUMINATING APPARATUS FOR A MICROSCOPE
SYSTEM USING POLARIZED LIGHT
Filed Dec. 3, 1962
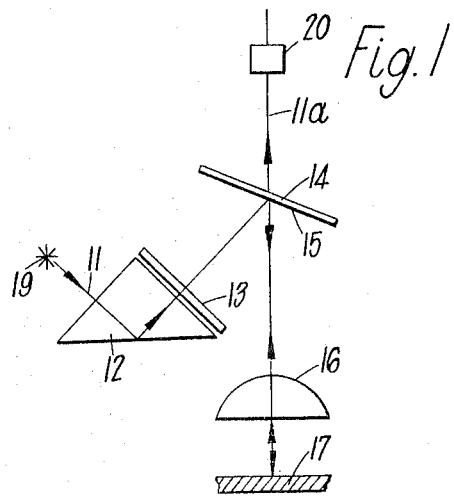
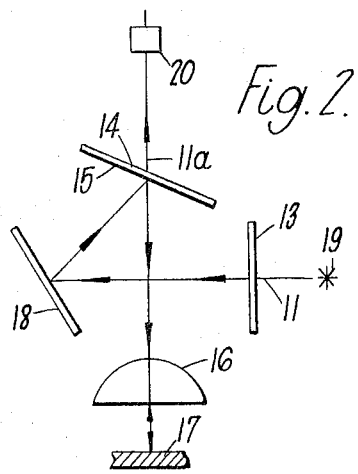
INVENTOR
Francis H. Smith
By Watson, Cole, Grindle + Watson
ATTORNEYS

United States Patent Office 3,277,782
Patented Oct. 11, 1966

3,277,782
ILLUMINATING APPARATUS FOR A MICROSCOPE SYSTEM USING POLARIZED LIGHT
Francis Hughes Smith, Purley, Surrey, England, assignor to C. Baker Instruments Limited, Croydon, Surrey, England, a British company
Filed Dec. 3, 1962, Ser. No. 241,612
Claims priority, application Great Britain, Dec. 8, 1961, 44,100/61
3 Claims. (Cl. 88—40)

The invention relates to optical apparatus.

The invention provides in a microscope for viewing a reflecting object, a source of polarised light, a semi-transparent reflector positioned to reflect on to the object polarised light from the said source and to receive and transmit light reflected by the object, the angle of incidence of the said polarised light from the said source on to the semi-transparent reflector being at the most 35 degrees.

The invention also provides illuminating apparatus for illuminating an object, which apparatus comprises a source of polarised light and means, including a semi-transparent reflector, for directing the polarised light on to the object, the angle of incidence of the polarised light on the reflector being not greater than 35 degrees when the object is being illuminated.

The invention also provides a microscope (or other optical apparatus) for producing an image of a reflecting object, including illuminating apparatus as aforesaid for illuminating the reflecting object.

The invention also provides a microscope (or other optical apparatus) for producing an image of a reflecting object, which apparatus includes a semi-transparent reflector arranged to reflect part of the amplitude of polarised light which is incident on it (when the apparatus is in operation) at an angle of incidence not greater than 35 degrees.

The invention also provides in a microscope (or other optical apparatus) for forming an image of a reflecting object by means of polarised light, a semi-transparent reflector positioned to reflect light on to the object and to receive and transmit light reflected by the object, the angle of incidence of the light on to the semi-transparent reflector being not greater than 35 degrees when the object is being illuminated.

Preferably the light is directed on to the object through an objective, or other optical system, which forms at least part of the means for forming the image.

Preferably the said angle of incidence is not greater than 22½ degrees.

Two specific constructions of a microscope embodying the invention will now be described by way of example and with reference to the accompanying drawings, in which FIGURES 1 and 2 show alternative forms of a vertical illuminator incorporated in a microscope which is used to view a prepared polished surface of an object through the objective lens by virtue of the light which is reflected back through the objective by the object.

In FIGURE 1, a beam of light represented by ray 11, originating from a light source 19, is reflected by a prism 12 and becomes plane polarised upon passing through a polarising plate 13. The polarised beam is then incident upon a semi-transparent plane reflector 14 which is situated in the body of the microscope, and extends across the entire aperture of the objective lens, so that the optical axis of the microscope passes through the reflector. After reflection, the ray 11 travels along the optical axis of the microscope and passes through an objective 16 on to an object 17 which is being viewed. The light is reflected by this object and passes back through the objective 16 to the semi-transparent reflector 14. The light which is transmitted by this reflector is represented by the ray 11a and is viewed by an eyepiece 20.

In FIGURE 2, which is the preferred specific construction, an illuminating beam which is represented by ray 11, enters the microscope perpendicular to the optical axis of the microscope. The beam represented by ray 11, originating from a light source 19, becomes plane polarised on passing through a polarising plate 13, and is then incident upon a plane mirror 18. After this reflection, the ray 11 is incident upon a semi-transparent reflector 14 and its path is then the same as that of ray 11 in FIGURE 1 after reflection by the reflector 14. Ray 11 is reflected by the semi-transparent reflector 14, passes along the optical axis of the microscope, through an objective 16 and is incident upon an object 17. The light reflected by the object passes back through the objective 16, and the beam represented by the ray 11a, which is transmitted by the semi-transparent reflector 14, is viewed by an eyepiece 20. In both the specific constructions shown in FIGURES 1 and 2, the angle of incidence for the ray 11 on reflection at the face 15 of the semi-transparent reflector 14 is 22½ degrees. The face 15 of the semi-transparent reflector 14 bears a light reflecting film such as titanium dioxide. The polarising plate 13 is preferably orientated such that the polarised beam of light which is incident upon the semi-transparent reflector 14, has its plane of polarisation perpendicular, or parallel, to the plane of incidence. In the specific construction shown in FIGURE 2, the angle of incidence of the ray 11 on the plane mirror 18 is 22½ degrees.

The invention is not restricted to the details of the foregoing examples. For instance, in the example shown in FIGURE 1, the illuminating beam may initially be perpendicular to the optical axis of the microscope, and deviated by some device, such as a prism, in order to take up the path of ray 11 shown in FIGURE 1.

In the two constructions shown, the illuminating beam reaches the object after reflection by the semi-transparent reflector 14 and reaches the final image position after transmission through the semi-transparent reflector. This sequence may be reversed by placing the source of ray 11 and the polarising plate 13 above the semi-transparent reflector, and the eyepiece so as to receive that light which is reflected by the semi-transparent reflector.

By using the angle of incidence at the semi-transparent reflector employed in these examples, certain difficulties which arise with an angle of incidence of 45 degrees are substantially reduced or avoided. Those difficulties are caused by the rotation of the vibration directions, that occurs at the reflection, of all rays for which the plane of incidence on the semi-transparent reflector is not perpendicular or parallel to the vibration direction of the incident ray. Those difficulties may be further reduced by employing an incidence angle of less than about 20 degrees. However, an incidence angle of 22½ degrees does not cause significant rotation of the vibration directions of rays for which the vibration direction at incidence is not perpendicular or parallel to the plane of incidence, and it does lead to a more convenient optical system.

I claim:

1. Illuminating apparatus for a microscope system including an objective lens, a reflecting specimen and viewing means with an optical path passing through the lens between the specimen and viewing means, comprising the improved combination of a source of polarised light external to said optical path, a single semi-transparent reflector positioned at a position on the optical path between the objective lens and the viewing means, means inserting said polarised light into the optical path from the source in a path twice passing through said position, once by reflection from the semi-transparent reflector at an angle of incidence not greater than 22.5° and once by transmission through the semi-transparent reflector, thereby illuminating the specimen for observation at said viewing means during passage through the optical path, said system constituting optical elements arranged to pass the polarised light from said source through the optical path to the viewing means without significant rotation.

2. A system as defined in claim 1 wherein the optical path between the specimen and viewing means is substantially a straight line normal to the specimen plane.

3. A microscope illuminating system as claimed in claim 1, which includes a further reflector whereby polarised light passing through the system as aforesaid is reflected by said further reflector in addition to being reflected by the said semi-transparent reflector, the angle of incidence of the polarised light on the further reflector being not greater than 22.5 degrees.

References Cited by the Examiner
UNITED STATES PATENTS

| | | | |
|---|---|---|---|
| 2,318,705 | 5/1943 | Morgan | 88—65 X |
| 2,601,346 | 6/1952 | Valensi | 88—65 X |
| 2,764,055 | 9/1956 | Clemens et al. | 88—65 X |
| 2,944,463 | 7/1960 | Rantsch | 88—40 X |
| 3,035,486 | 5/1962 | Benford | 88—40 |

FOREIGN PATENTS

| | | |
|---|---|---|
| 378,833 | 8/1923 | Germany. |
| 378,834 | 8/1923 | Germany. |
| 848,351 | 9/1960 | Great Britain. |

OTHER REFERENCES

Born et al., Principles of Optics, 1st edition, 1959, pages 44–45.

DAVID H. RUBIN, *Primary Examiner.*

RONALD L. WIBERT, *Examiner.*

L. ORLOFF, J. G. BOLTEN, *Assistant Examiners.*